Aug. 31, 1954   H. G. HIRSCH ET AL   2,687,797
ARTICLE HANDLING MACHINE
Filed May 8, 1948                                          2 Sheets-Sheet 1
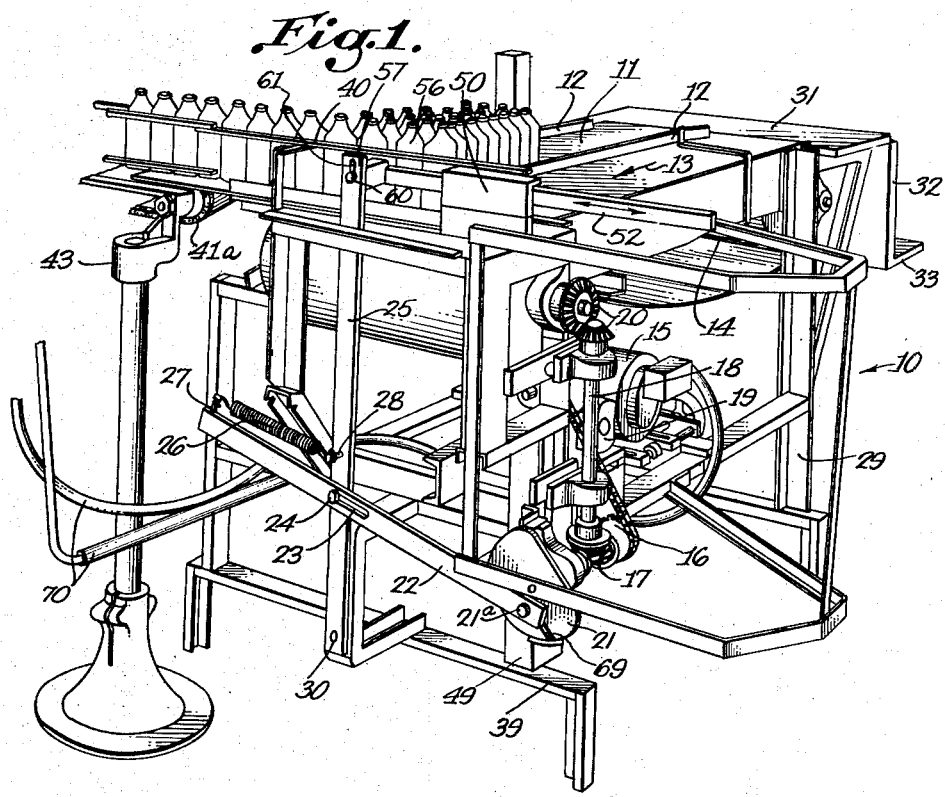
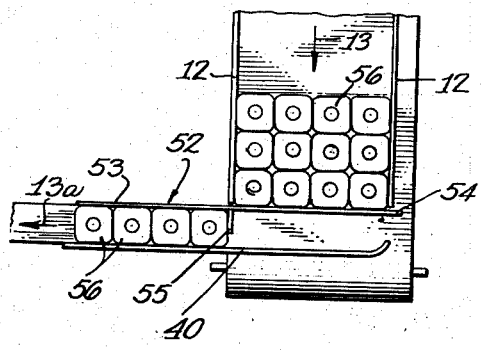
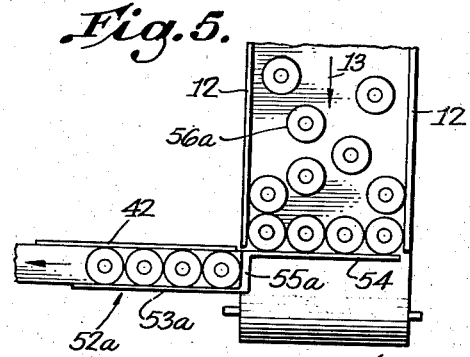
Inventors,
Harry G. Hirsch.
Albert B. Judson.
By

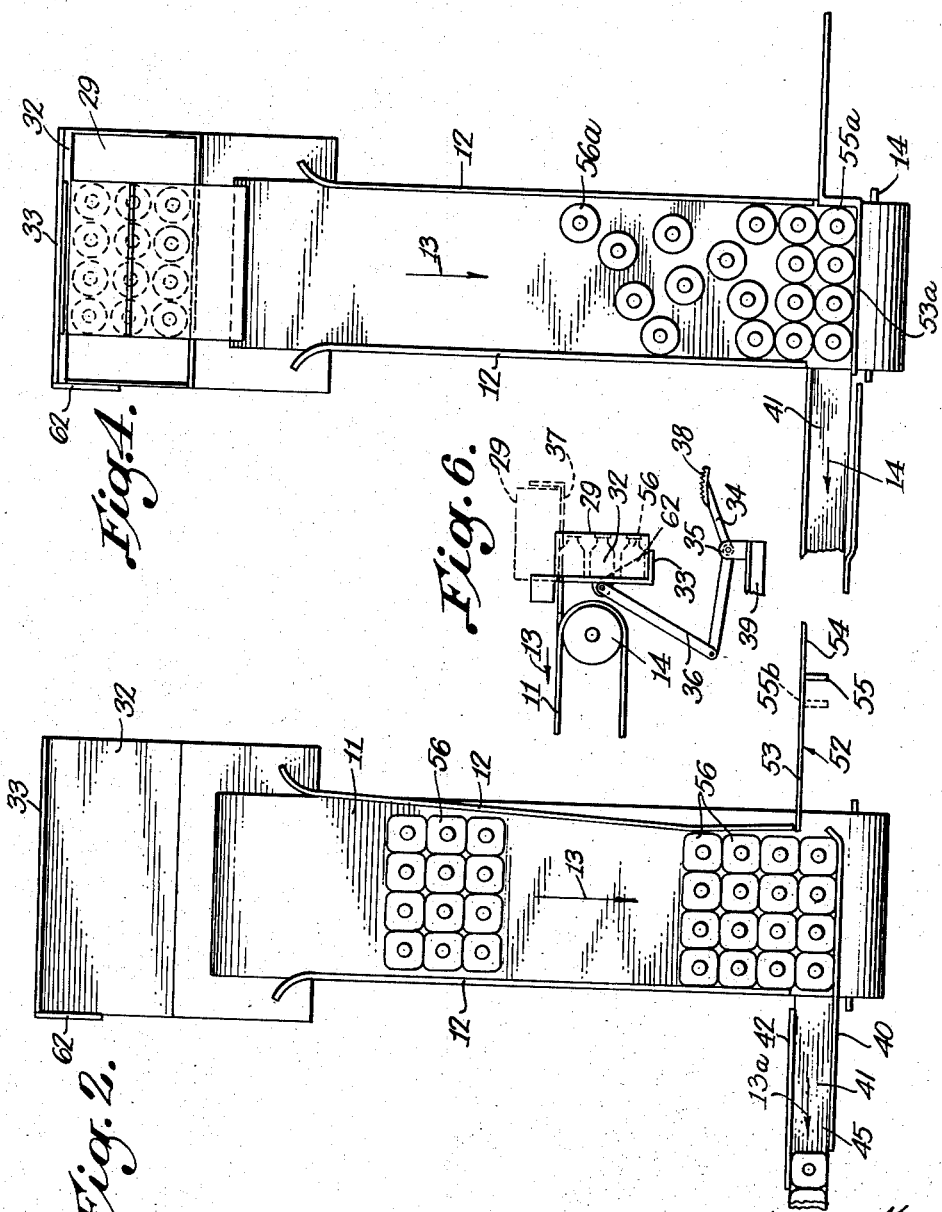

Patented Aug. 31, 1954

2,687,797

UNITED STATES PATENT OFFICE 2,687,797

ARTICLE HANDLING MACHINE

Harry G. Hirsch and Albert B. Judson, Chicago, Ill., assignors to Glaser Crandell Company, Chicago, Ill., a corporation of Illinois Application May 8, 1948, Serial No. 33,065

16 Claims. (Cl. 198—32)

The present invention relates to machines for handling small articles and particularly to machines for feeding containers such as bottles into devices which cleanse, fill and seal them.

In the process of packaging commodities in bottles by machinery, the bottles are preferably washed, rinsed, dried and fed into the packaging machine one at a time in a continuously moving column by a conveyor which moves the bottles along in a single file. At the beginning of the conveyor belt the bottles are either placed by hand upon the conveyor belt in a single row or are picked out of a large group one at a time under a positive drive.

If the bottles are placed by hand on a single column conveyor belt, a great deal of breakage, upset bottles and delays occur due to the human inability to handle fragile articles individually and continuously without mishaps. Furthermore, in view of the fact that packaging machines do not process the bottles as fast as a person can stack them on a single column conveyor, there is either a loss of labor efficiency or a waste of floor space encountered. Either the person loading the conveyor must slow his activity to the speed of the conveyor at a single loading station, or the loading station of necessity must be excessively long if the services of the loader are to be intermittently used to perform other tasks.

If the bottles are picked out of a large reserve hopper one at a time by machinery, which generally can only be done with circular bottles, such machinery must work in stepped relationship with the conveyor and filler and stop when an overall shutdown occurs in the line. Otherwise the conveyor can be overloaded, i. e., filled so full that additional bottles fed to it cause breakage or strains upon the machinery. On the other hand, where a stepped progressive relationship or a total shutdown system is employed to avoid compressive breakage, other difficulties are experienced. Interconnecting gearing between units is involved, flexibility is lost and, if a bottle is removed from the conveyor for any reason whatsoever, the sequence is broken and a gap is left in the production output if it is not immediately replaced, all of which requires fixed relationship and the constant attendance of skilled labor.

Of course, it is possible to employ automatic controls such as electric eyes on the conveyor to stop automatically the loader when the conveyor belt is full, but many problems beset such systems due to the fact that they are also responsive to bottles as they move past the detector, and repeated shutdowns occur even when the detector is delayed sufficiently to let single bottles pass.

In the present invention, bottles can be unloaded rapidly in an orderly or heterogeneous group at a single station with sufficient storage capacity afforded that a portion of the loader's time can be used elsewhere.

The invention is also characterized by a resilient overfeed device which keeps the single column chute to the processing machines full without exerting positive compressive forces upon the bottle which would cause breakage.

Another object of the invention is to unscramble bottles from a heterogeneous group and align them in single file for advancement to processing machines in an improved way.

A further object of the invention is to align a lead row of bottles along a barrier by advancing them transversely thereagainst and then move the lead row in a direction longitudinally of the barrier to create a single column of bottles moving lengthwise of the column away from the barrier and instituting the formation of the next or successive lead row of bottles while so moving the preceding lead row. Furthermore, in the present invention the wide conveyor can be fully loaded at one station so that the displacement device not only operates to feed bottles at a rate slightly faster than needed by the machinery without jamming the line or breaking bottles without need for continuous attendance, but there will be time to spare for the loader to perform other services between loadings.

The invention also contemplates and is particularly useful in unloading a group of empty bottles of a square or irregular shape from a container in a predetermined way so that the bottles unloaded are marshalled and continually subjected to an advancing motion as a group towards a barrier in multi-columnar positions, thereafter to be moved as needed in a single column file in a rectilineal direction laterally to their initial line of advancement.

Another object of the invention is to provide a bottle unscrambler which is simple in construction and arrangement, easy to operate and control, and inexpensive to manufacture and maintain.

These being among the objects of the invention, other and further objects will become apparent from the drawings, and description relating thereto, and the appended claims.

Referring to the drawings:

Fig. 1 is a perspective view of a device embodying one form of the invention;

Fig. 2 is a top plan view of the embodiment shown in Fig. 1 in resting position preparatory to moving a lead row of bottles from the wide conveyor onto the narrow conveyor;

Fig. 3 is a view similar to Fig. 2 showing the relationship of the elements when the lead row of bottles has been pushed from the wide conveyor belt to the narrow belt;

Fig. 4 is a view similar to Fig. 2 illustrating the preferred embodiment of the invention in its resting position;

Fig. 5 illustrates the relationship of elements shown in Fig. 4 after the lead row of bottles has been pushed from the wide conveyor onto the narrow one; and Fig. 6 is a side elevation diagrammatically showing the improved arrangement of the invention by which bottles may be loaded onto the wide conveyor belt.

By way of illustrating the present invention, several embodiments are illustrated in connection with the handling of bottles preliminary to filling them with food products such as preserves, jellies, etc.

The bottles to be filled are shipped to the bottler by the glass manufacturer in the ultimate shipping cartons. The cartons containing the unfilled bottles are not sealed, and when received they are opened at the bottom of the bottles, placed against a vertical wall and the wall pivoted to a horizontal position to dispose the bottles upright. The pivoted wall has appropriate guides regarding the ultimate location of the bottles on the belt. After the elevator is raised the carton and bottles are pushed as a unit onto the wide conveyor belt and the carton is lifted to free the bottles in the proper location.

When released the bottles are advanced by the belt between two, preferably converging, side rails to a station where the rails are spaced a distance which is a multiple of the outside diameter of the bottles, which multiple is preferably equal to the rows of bottles in the carton.

As the bottles are advanced to this station, they are marshalled against a transverse barrier by continual movement of the conveyor belt passing under the barrier so that the bottles align themselves in rectilineal rows extending transversely of the belt with the lead row resting against the barrier. A reciprocating displacement device moves the lead row in a direction lateral to the original line of bottle movement and as a single column onto a narrow belt running laterally away from the wide belt. The displacement device is operated recurrently to be advanced by a resilient spring to move the bottles laterally and to be retracted by a cam to pick up another lead row. The shoulder device will advance its full throw or only part way, depending upon the unfilled space available for bottles upon the narrow belt.

Referring now to Fig. 1, a bottle loading device 10 is shown having a wide conveyor belt 11 bounded on opposite sides by side rails or guides 12 and moving in the direction of the arrow 13. The conveyor belt is one preferably of metal webbing which is looped around rollers 14 by which it is driven from a continuously running motor 15 through a train of elements which includes a speed reduction transmission 19, a chain and sprocket transmission 16, bevel gears 17, a vertical shaft 18, and another set of bevel gears 20.

A crank plate 21 is also driven from the bevel gears 17 to reciprocate a push rod 22 having a lost motion slot 23 therein receiving a headed pin 24 carried on a lever 25 that is pivoted as at 30. The pin 24 is held in its outward limit of movement at the outer end of the slot 23 by means of a tension spring 26 which is fastened by a stud 27 to the end of the push rod 22, and by a second stud 28 upon the lever 25.

Suitable framework and journals are provided for the shafts and respective parts including uprights 29, cross members 39 having legs thereon and braces 49, all of which are preferably welded together as a rigid unit.

A platform 31 is provided at the end of the conveyor belt 11 where it has hinged thereto an elevator 32 comprising a bed with a side wall 33 secured along the free edge thereof. As more particularly shown in Fig. 6 the elevator is preferably raised and lowered by a foot treadle 34. The treadle is pivoted upon the floor as at 35 to drive a link 36 which in turn raises and lowers the elevator 32 from a normally vertical position to an alternate horizontal position as shown in dotted lines 37.

At the other end of the conveyor belt 11 a transverse barrier 40 is provided which obstructs forward movement of articles placed upon the belt 11. This barrier extends laterally as more particularly shown in Fig. 2 across the wide belt and along the edge of a narrow conveyor belt 41 whose end is supported upon a roller 41a journaled in a floor standard 43. The floor standard is movable and the narrow conveyor belt is powered independently of the wide conveyor belt to run in the direction indicated by arrow 13a. In the embodiment shown, the end of the narrow belt is located proximate to the side of the wide conveyor belt 11 in front of the barrier 40. A second barrier 42 located on the opposite side of the narrow belt 41 cooperates with the first barrier 40 and other extensions thereof to provide a guideway above the narrow belt 41 to keep the bottles in single file.

Mounted for reciprocatory movement in a guideway 50 is an element or member 52 which, as shown in Figs. 2 and 3, has longitudinally aligned barriers 53 and 54 disposed on opposite sides of a shoulder member 55. The barriers 53 and 54 are spaced from the barrier 40 a distance approximately the thickness of the bottles 56 for which the device 10 is designed to handle and the shoulder member extends from the barriers 53 and 54 in the direction of the barrier 40. The element 52 is secured to the free end 57 of the lever 25 by means of a pin 60 on the element 52 received in a vertically extending slot 61 provided in the lever 25. The slot 61 allows the end of the lever 25 to describe an arcuate path and yet reciprocate the element 52 along a straight line.

Thus as the motor 15 rotates, the crank plate 21 operates to reciprocate the push rod 22 and move the spring 26. With this movement, the lever 25 is drawn by the tension of the spring 26 to hug the outermost limit permitted to it by the slot 23, and if free to do so will move to the position indicated in Fig. 3 at its outermost limit of movement as determined either by the terminal movement of the push rod 22 or by a stop (not shown). Then upon the back cycle of the crank plate 21 the pin 24 is positively pulled by the push rod 22 back to the position shown in Fig. 2 in which both barriers 53 and 54 clear the guideway defined by the side members 12.

Whenever a container 29 of bottles is to be placed upon the belt 11 the side of the container, which is preferably a corrugated box, has the flaps opened on it which are on the side of the box next to the bottoms of the bottles 56. When the flaps have been opened they are folded back against the sides and the container 29 is brought with the bottom of the bottles against the upright portion 32 of the elevator with the lower edge of the box resting against the wall 33. An indexing element 62 located at one end of the elevator 32 not only structurally strengthens the wall 33 to carry the load thus imposed upon it by the weight of the container but also serves as an indexing device in conjunction with the outspread end flaps of the container so that the bottles in the container are located directly in line with the conveyor 11 between the side rails 12.

The operator steps upon the treadle 38 and with his weight moves the elevator 32 from its vertical position to its broken line position 37 as shown in Fig. 6, whereupon the box 29 is pushed forwardly upon the conveyor 11 and lifted to release the bottles to the movement and control of the conveyor 11.

Once released from the container the bottles are carried forward as a group in correct position and in the direction indicated by the arrow 13 until they engage the barrier 40. The distance between the two side rails 12 at their ends nearest to the barrier 40 is preferably some multiple of the dimension of the bottles. In the particular embodiment illustrated, the guideways are separated just enough to accommodate as many rows of bottles as there are layers of bottles in the container at its widest dimension. This could vary from four to ten, depending upon the size of the container employed, without departing from the spirit of the invention. This spacing of the side rails enables the bottles to align themselves in a rectilineal lead row against the barrier at a station directly in the path traversed by the shoulder 55 when the element 52 is reciprocated by the crank plate 21.

Then when the crank plate 21 is rotated, the leading barrier 53 knifes between the lead row and the second row of bottles without obstruction until the shoulder 55 engages the nearest bottle of the lead row, whereupon the bottles in the lead row are held in proper position and the lead row is moved lengthwise laterally from the conveyor belt 11 onto the narrow conveyor belt 41, upon which the bottles 56 in the lead row are carried along between the guideways 40 and 42 to a machine (not shown) which preferably washes, rinses, dries, fills and seals the bottles with any one of a large number of commodities including food stuffs such as preserves, jellies, sauces, catsups, whiskeys, wines, etc.

When the shoulder 55 is being advanced to its forward limit of movement the barrier 54 serves to jostle and shuffle the second row of bottles into proper alignment preparatory to the element 52 being returned to its original position on its back stroke. The bottles are further agitated rotatively and otherwise as barriers 53 and 54 move across the bottles on the back stroke. Then when the barriers clear the bottles, the bottles in the next row are ready to advance against the barrier 40 and become the next lead row for displacement to the narrow conveyor belt upon the next cycle of the barriers and shoulder.

It will be observed that the drive of the wide conveyor belt 11 is independent of the drive of the narrow conveyor belt 41. It is preferred to have the conveyor belt 11 move a little faster than the corresponding bottle displacement of the conveyor 41 so that the device 10 is always overfeeding the conveyor belt 41.

In event that the narrow conveyor belt 41 is so full at any given time that it will not accommodate a full load of bottles displaced by the shoulder 55, the spring 26 stretches to permit the positive thrust effort of the crank 21 to be dissipated through lost motion of the pin 24 in the slot 23 without relieving the bottles from an advancing pressure but preventing any positive displacement of the bottles which would break them. In other words, the element 52 is displaced by the spring 26 as far as it is free to go in pushing bottles off the wide band belt 11 onto the narrow conveyor belt 41.

Referring now to the embodiment illustrated in Figs. 5 and 6, the barrier 40 may be dispensed with because the lead barrier 53a of the element 52a serves a double function. In this construction the shoulder 55a has the lead barrier 53a thereon located in alignment with the other side of the narrow conveyor belt 41, the trailing barrier 54 otherwise functioning as already described. In this construction, when the shoulder 55 is in its retracted position as shown in Fig. 4, the leading barrier 53a serves to stop the forward movement of the bottles 56a align them therealong preparatory to the shoulder 55a displacing them laterally upon the narrow conveyor 41.

The travel of the embodiment shown in Fig. 5 is reduced by the length of one of the barriers, namely, barrier 53, and the shoulder 55a is located in its resting position in close proximity to bottles so that its initial advance movement brings it into contact with the bottles while it is moving slowly, thus avoiding noise as well as being able to operate the feeder at a high rate of speed without danger of breaking bottles. In order to accommodate this difference in reciprocation travel the securement of the lever 25 to the element 52 is preferably located at the shoulder 55a and the overthrow effect of the push rod 22 is absorbed in the spring 26 by the barrier 55a being obstructed by a stop (not shown) halfway through the full throw movement of the lever 25. Moreover, if the machine is to be adjusted to handle bottles of a different size, a slot 69 is provided in the crank plate by which the eccentricity of the crank pin 21a can be correspondingly adjusted and the barriers 53 and 54 are shifted correspondingly with respect to the shoulder 55. No shift in this last respect is needed with respect to barrier 53a and shoulder 55a.

Power is supplied to the motor through electrical conduits 70 as controlled by suitable switches (not shown) and if desired a clutch actuated trip can be employed in place of the treadle 34 to raise the elevator with power if desired.

Having thus described the invention in connection with several embodiments and their operation, it will be seen how the objects of the invention are accomplished and how other and further embodiments and modifications may be made without departing from the spirit of the invention, the scope of which is commensurate with the appended claims.

What is claimed is:

1. In a device of the class described the combination of a barrier, a wide band conveyor belt for conducting articles in column to a predetermined station in front of the barrier means movable transversely of the belt to displace a row of articles from said station including a shoulder and a second barrier element having a trailing portion on one side of said shoulder for restraining other articles from said station while said shoulder is above said belt and a leading portion on the other side of said shoulder to knife between said articles and separate the lead row for free movement, and resilient means for moving said shoulder to displace said articles from the station.

2. In a device of the class described the combination of a barrier, a wide continually moving conveyor belt for conducting articles in column to a predetermined station in front of the barrier, a narrow continually moving belt disposed proximate to said station, means movable transversely of the belt to displace a row of articles from said station to said narrow belt including a member having a shoulder and a second barrier element trailing said shoulder for restraining other articles from said station while said shoulder is above said wide belt, and a third barrier spaced from the first barrier approximately the thickness of one of said articles and disposed along the side of said narrow belt proximate to said wide belt to hold said row of articles in line while same is being displaced from said station to said narrow belt.

3. In a device of the class described the combination of a first barrier, a wide continually moving conveyor belt for conducting articles in a plurality of rows to the barrier defining a predetermined station in close column formation, means movable transversely of the belt to displace articles from said station in a single row including a reciprocating member having a shoulder carried back and forth over said belt and a second barrier element trailing said shoulder for restraining other articles from said station while said shoulder is above said belt, and a third barrier element disposed in alignment with said second barrier in front of said shoulder at one side of said conveyor belt to hold the row of articles in line while the shoulder displaces same.

4. In a device of the class described the combination of a barrier, a conveyor belt accommodating a plurality of transversely spaced rows of articles thereon in front of the barrier, a reciprocating device mounted to move transversely above said belt and including a shoulder and a second barrier extending on both sides of the shoulder for separating the lead articles from said rows and moving them into a single file column at one side of the belt.

5. In a device of the class described the combination of a conveyor belt accommodating a plurality of transversely spaced rows of articles thereon, a reciprocating device mounted to move transversely above said belt and including a shoulder and two barriers, one on each side of the shoulder, one of which barriers restrains the rows of articles during reciprocation of said device, and a third barrier cooperating with the other one of said two barriers to conduct the lead articles in each row in a line of their own in front of said shoulder.

6. In a device of the class described the combination of a barrier, continuously running wide band conveyor belt for conducting articles in column to a predetermined station in front of the barrier, means movable transversely of the belt to displace articles from said station including a shoulder and a second barrier element trailing said shoulder for restraining other articles from said station while said shoulder is above said belt, a third barrier parallel to the first barrier to conduct articles displaced from said station in a path disposed transversely to said wide belt.

7. In a device of the class described the combination of a conveyor belt accommodating a plurality of transversely spaced rows of articles thereon, a reciprocating device mounted to move transversely above said belt and including a shoulder and two longitudinally aligned barriers extending on opposite sides of said shoulder on the side thereof nearest to the advancing rows of articles, said barriers being removed from the path of said rows in their resting position, and a stationary barrier disposed along the path of the wide belt beyond said reciprocating device.

8. In a device of the class described the combination of a conveyor belt accommodating a plurality of transversely spaced rows of articles thereon, a stationary barrier extending crosswise of the belt, a reciprocating device mounted to move transversely above said belt and including a shoulder movable in front of said barrier, and two longitudinally aligned barriers extending on opposite sides of said shoulder at one edge and spaced from the first barrier a distance equal to the thickness of said articles, said last two barriers being removed from the path of said rows in their resting position.

9. In combination, a wide continually moving conveyor belt, spaced guide rails above it extending in the direction of movement of the belt for marshalling articles deposited on said belt into a column, said rails defining a wide guideway whose floor is the belt, a transverse barrier at the end of the guideway above the belt, a narrow conveyor belt running in a direction parallel to said barrier and defining a narrow guideway, a reciprocably mounted element including a shoulder movable transversely to the belt in front of the barrier and transcribing a path in alignment with said narrow guideway, said element also including a secondary barrier movable with said shoulder along a path parallel to the first barrier for holding articles away from the first barrier during reciprocation of the element, and a third barrier cooperating with the first barrier on the opposite side of said narrow belt to hold in single file articles moved by said shoulder.

10. In combination, a wide conveyor belt, spaced guide rails above it extending in the direction of movement of the belt and defining a wide guideway whose floor is the belt, said guideway being approximately the same width as a column of articles several articles wide deposited on said belt, a transverse barrier at the end of the guideway above the belt, a narrow conveyor belt running in a direction parallel to said barrier and defining a narrow guideway approximately the width of a single article, and means for transferring articles resting against said barrier to said narrow belt including a pair of barriers in alignment with each other spaced from and parallel to the first barrier, a reciprocably mounted element including a shoulder movable transversely to the belt in front of the barrier and transcribing a path in alignment with said narrow guideway.

11. The combination called for in claim 2 in which the first barrier is carried by said member in front of said shoulder.

12. The combination called for in claim 3 in which the first barrier is carried by said reciprocating member in front of said shoulder.

13. The combination called for in claim 5 in which the two barriers are spaced from each other lengthwise of said shoulder.

14. The combination called for in claim 6 in which the first barrier is carried by said transversely movable means.

15. The combination called for in claim 9 in which said transverse barrier is carried by said reciprocal member in front of said shoulder.

16. The combination called for in claim 10 in which the transverse barrier is carried by said reciprocally mounted element at the side of said path which is of said movement of the belt.

References Cited in the file of this patent

UNITED STATES PATENTS

| Number | Name | Date |
|---|---|---|
| 724,240 | Baker | Mar. 31, 1903 |
| 1,247,722 | Rogers | Nov. 27, 1917 |
| 1,455,966 | Owens | May 22, 1923 |
| 1,612,215 | Phelps | Dec. 28, 1926 |
| 1,654,706 | Schoen | Jan. 3, 1928 |
| 1,673,091 | Risser | June 12, 1928 |
| 2,021,696 | Miller | Nov. 19, 1935 |
| 2,470,795 | Socke | May 24, 1949 |